United States Patent
Black et al.

(10) Patent No.: US 11,400,364 B2
(45) Date of Patent: Aug. 2, 2022

(54) CONTROLLER WITH SWAPPABLE INPUT CONTROLS

(71) Applicants: Sony Interactive Entertainment LLC, San Mateo, CA (US); Sony Interactive Entertainment Inc., Tokyo (JP)

(72) Inventors: Glenn Black, San Mateo, CA (US); Alvin Daniel, Redwood City, CA (US)

(73) Assignee: SONY INTERACTIVE ENTERTAINMENT INC., Tokyo (JP)

(*) Notice: Subject to any disclaimer, the term of this patent is extended or adjusted under 35 U.S.C. 154(b) by 0 days.

(21) Appl. No.: 16/837,878

(22) Filed: Apr. 1, 2020

(65) Prior Publication Data

US 2021/0308563 A1 Oct. 7, 2021

(51) Int. Cl.
*A63F 13/24* (2014.01)
*A63F 13/22* (2014.01)

(52) U.S. Cl.
CPC .............. *A63F 13/24* (2014.09); *A63F 13/22* (2014.09)

(58) Field of Classification Search
CPC ........ A63F 13/22; A63F 13/24; A63F 13/235; A63F 13/26; A63F 13/98
See application file for complete search history.

(56) References Cited

U.S. PATENT DOCUMENTS

| | | | |
|---|---|---|---|
| 9,227,141 B2 | 1/2016 | Mays, III et al. | |
| 9,764,230 B2 | 9/2017 | Gassoway et al. | |
| 9,937,415 B1 | 4/2018 | Makuch et al. | |
| 2004/0090416 A1 | 5/2004 | Biheller et al. | |
| 2005/0255915 A1 | 11/2005 | Riggs et al. | |
| 2006/0264260 A1 | 11/2006 | Zalewski et al. | |
| 2008/0214305 A1* | 9/2008 | Addington | A63F 13/235 463/36 |
| 2008/0220865 A1 | 9/2008 | Hsu | |
| 2009/0054146 A1 | 2/2009 | Epstein et al. | |
| 2009/0213081 A1 | 8/2009 | Case, Jr. | |
| 2011/0028194 A1 | 2/2011 | Tang et al. | |
| 2011/0105231 A1* | 5/2011 | Ambinder | A63F 13/24 463/38 |
| 2011/0227841 A1* | 9/2011 | Argiro | G06F 3/04886 345/173 |
| 2012/0260006 A1* | 10/2012 | Hamada | A63F 13/24 710/30 |
| 2012/0302347 A1 | 11/2012 | Nicholson | |
| 2013/0093690 A1* | 4/2013 | Papakipos | G06F 3/0488 345/173 |
| 2013/0154542 A1 | 6/2013 | Joynes et al. | |
| 2014/0078312 A1 | 3/2014 | Zalewski et al. | |
| 2015/0084900 A1* | 3/2015 | Hodges | G06F 3/0338 345/173 |
| 2015/0194279 A1 | 7/2015 | Rubio | |

(Continued)

OTHER PUBLICATIONS

International Search Report and Written Opinion dated Aug. 5, 2021 for International Patent Application No. PCT/US2021/025336.

(Continued)

*Primary Examiner* — Omkar A Deodhar
*Assistant Examiner* — Shauna-Kay Hall
(74) *Attorney, Agent, or Firm* — JDI Patent; Joshua Isenberg; Robert Pullman

(57) ABSTRACT

A controller device comprises a controller body that includes at least two interface ports and a control information output port. A modular input control that is removably attachable to the controller body includes an interface connector region that communicatively couples the modular input control to any of the at least two interface ports.

18 Claims, 8 Drawing Sheets

(56) References Cited

U.S. PATENT DOCUMENTS

| | | | |
|---|---|---|---|
| 2015/0234479 A1 | 8/2015 | Schantz et al. | |
| 2016/0082349 A1 | 3/2016 | Burgess et al. | |
| 2016/0175711 A1 | 6/2016 | Billington et al. | |
| 2016/0317920 A1* | 11/2016 | Schmitz | A63F 13/00 |
| 2016/0361635 A1* | 12/2016 | Schmitz | A63F 13/218 |
| 2018/0035850 A1 | 2/2018 | Larsson et al. | |
| 2018/0056180 A1 | 3/2018 | Russell et al. | |
| 2019/0060746 A1 | 2/2019 | Ironmonger et al. | |
| 2019/0176033 A1 | 6/2019 | Ironmonger et al. | |
| 2020/0054942 A1* | 2/2020 | Strahle | A63F 13/98 |
| 2020/0086211 A1* | 3/2020 | Goerz | A63F 13/21 |
| 2020/0151733 A1 | 5/2020 | Sidhu | |
| 2020/0298110 A1 | 9/2020 | Koziel | |

OTHER PUBLICATIONS

International Search Report and Written Opinion dated Jul. 8, 2021 for International Patent Application No. PCT/JS2021/025341.
International Search Report and Written Opinion dated Aug. 5, 2021 for International Patent Application No. PCT/US2021/025327.
International Search Report and Written Opinion dated Jul. 27, 2021 for International Patent Application No. PCT/US2021/025330.
Non-Final Office Action for U.S. Appl. No. 16/837,863, dated Jun. 4, 2021.
Rewired., "Controller Maps" (Jul. 20, 2019) [retrieved on Aug. 9, 2021]. Retrieved from the Internet, pp. 1-10.
Final Office Action for U.S. Appl. No. 16/837,897, dated Jan. 25, 2022.
Non-Final Office Action for U.S. Appl. No. 16/837,863, dated Nov. 29, 2021.
Non-Final Office Action for U.S. Appl. No. 16/837,888, dated Oct. 15, 2021.
Non-Final Office Action for U.S. Appl. No. 16/837,897, dated Sep. 10, 2021.
"How to switch your Joy-Cons back to normal from sideways on Nintendo Switch" by Lory Gil, Dated May 10, 2017. (Year: 2017).
Non-Final Office Action for U.S. Appl. No. 16/837,888, dated Jun. 6, 2022.

* cited by examiner

CONTROLLER WITH SWAPPABLE INPUT CONTROLS

FIELD OF THE DISCLOSURE

Aspects of the present disclosure relate to controllers, specifically aspect of the present disclosure relate to videogame controllers.

BACKGROUND OF THE DISCLOSURE

Many game systems, including computers, use hand held controllers to operate the system and play videogames. A major drawback of current controllers is the ergonomics.

It is within this context that aspects of the present disclosure arise.

BRIEF DESCRIPTION OF THE DRAWINGS

The teachings of the present disclosure can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

According to aspects of the present disclosure a specialized controller is not required to be hand-held. Additionally the specialized controller may have modular controls with different control configurations and modalities allowing the user to customize the controller to fit their needs.

Figure 1:
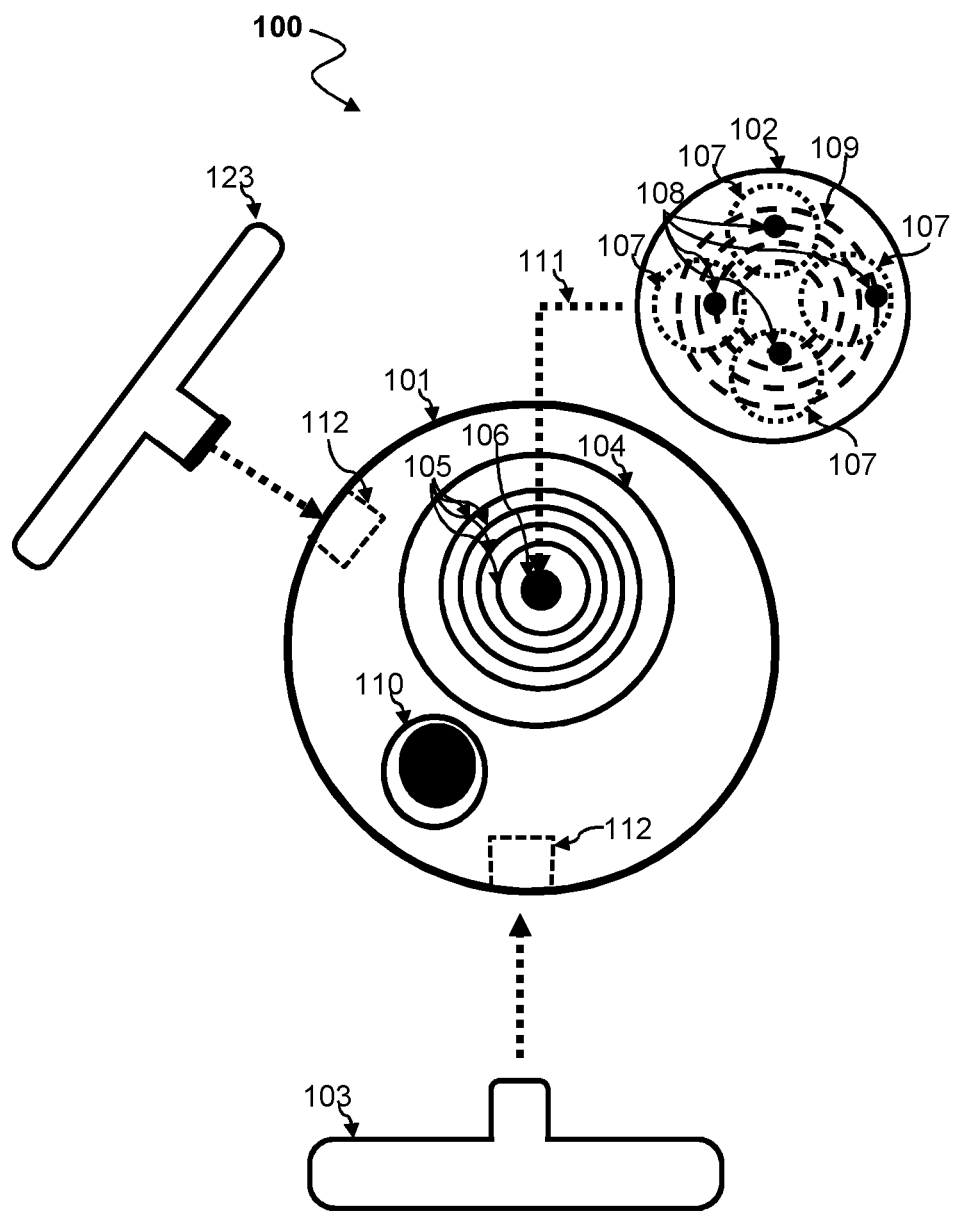
FIG. 1 depicts a top view of a controller with a bottom view of a modular input control according to aspects of the present disclosure.

FIG. 1 depicts a top view of a controller with a bottom view of a modular input control according to aspects of the present disclosure. The controller 100 as show comprises at least a controller body 101 and a modular input control 102. The controller body 101 may include a joystick 110 and interface ports 104. In alternative embodiments of the present disclosure, the controller body may include more than one interface port. Additionally the controller may optionally include modular input control paddles 103, 123 that are configured to be removably attachable to side and/or top paddle interface ports 112 on the controller body 101. The ports 112 may include switches, e.g., electronic, mechanical, or optical switches, which may be either analog or digital switches. Such switches may be communicatively coupled to a control board housed within the controller body 101. The Joystick 110 shown in this embodiment may be operably affixed to the controller body 101. That is the joystick 110 shown in this embodiment is not removable but moves during operation. In alternative embodiments such as those shown in FIG. 2, the joystick may be removably attached to the controller body.

The interface port may include one or more communication pads 105 along the bottom or sides of the interface port 104. As shown the communication pads 105 are concentric circles of electrically conductive material along the bottom of the interface port 104. Circular communication pads 105 allow the modular input control 102 to be rotated freely within the interface port 104 and maintain operably around the axis of rotation. In an alternative embodiment, the communication pads may run circumferentially along the sidewall of the controller body 101 with different pads being vertically separated along the sidewall of the interface port 104. The communication pads 105 may be, for example and without limitation, metal regions, conductive metalized plastic regions, conductive rubber regions etc. the communication pads may be conductively or communicatively coupled to a control board within the controller body and ultimately to the video game system.

As used herein conductive coupling refers to coupling via an electrically conductive or semiconducting medium that can transmit electric current or electrical impulses. As used herein communicative coupling includes conductive coupling and more broadly refers to coupling that permits transmission of an impulse or signal. By way of example, and not by way of limitation, communicative coupling may be implemented through mechanical contact, through transmission of electric, magnetic, or electromagnetic fields, by electromagnetic induction, by transmission acoustic or optical energy, by transmission of electric current or electrical impulses, or some combination of two or more of these.

The interface port 104 may also include an attachment mechanism 106 such as a magnet or mechanical clasp that allows the modular input control 102 to be removably secured to the controller body and, in some implementations, allows the modular input control to rotate in the interface port 104. In some alternative implementations, the attachment mechanism 106 may be integrated into the side of the interface port or the side of an interface connector region of the modular input control.

The modular input control 102 may include one or more buttons 107. In the non-limiting example shown in FIG. 1, the modular input control includes a plurality of buttons 107 but aspects of the present disclosure are not so limited and may include a single button, two buttons or any number of buttons. Additionally the modular input control 102 is not limited to buttons and may include different control modalities other than buttons. The different control modalities may include, for example and without limitation, joysticks, directional pads, toggle switches, touch pads, scroll wheels, scroll pads, and the like. The modular input control 102 includes an interface connector region 109 configured to communicatively couple the modular input control 102 to the controller body 101. In the example shown connection points 108 such as connector pins, pogo pins etc. are used to form a conductive and communicative connection between the modular input control 102 and the controller 101. As discussed above communication may be between the modular input control 102 and a control board housed within the controller body 101. The dotted concentric rings show the alignment of the connection points 108 in relation to the communication pads 105 in the interface port 104. Each connection point 108 may be located so that it lines up with a different concentric communication pad 105 thus allowing the modular input control to be rotated within the interface port 104 without breaking a connection between a connection point 108 and a communication pad 105. Similarly, in an alternative embodiment, the connection point may be located on the side of the interface connector region and each connection point may be mounted vertically to line up with vertically aligned communication pads. The dashed arrow 111 shows a mounting location for the modular input control 102 to the controller body 101. The plurality of buttons 107 are shown as dotted lines to emphasize that they are located on the opposite side of modular input control 102.

Figure 2:
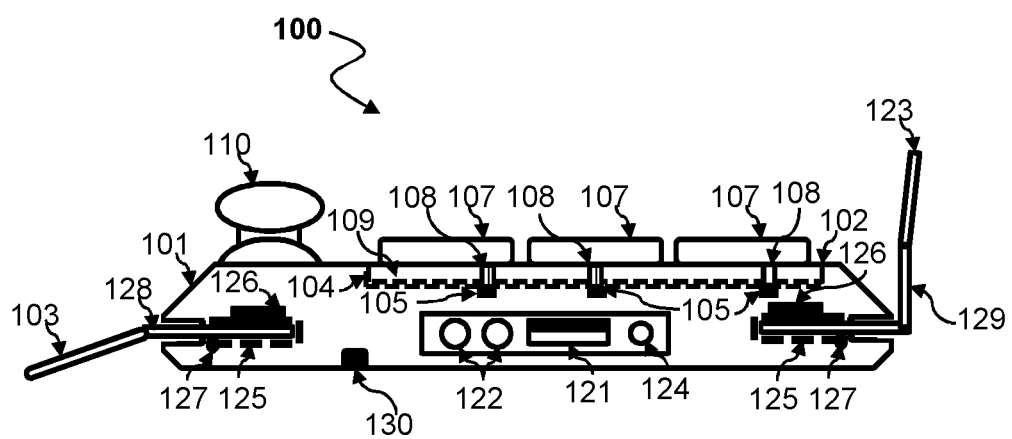
FIG. 2 shows a side view of the controller with a modular input control removably attached to the controller according to aspects of the present disclosure.

FIG. 2 shows a side view of the controller with a modular input control removably attached to the controller according to aspects of the present disclosure. As seen, the modular input control 102 fits within the interface port 104 and the connection points 108 make conductive and communicative contact with the communication pads 105. The interface connector region 109 may sit within the interface port so that the bottoms of the buttons 107 are flush with the top of the controller body. In some embodiments, the communication pads may be recessed below a bottom plane of the interface port and connection pins may extend below the bottom plane of the interface port to make contact with the communication pads.

The controller body 101 may also include one or more control information output ports 121, (optionally) one or more external device input ports 122, and (optionally) a power port 124. The control board within the control body 101 may be configured to communicate control inputs from the modular input controls 102, control paddles 103, 123 and joystick 110 though the communication output port 121 to a game system. It should be note that communication to the game system is not limited to the output port 121. In alternative embodiments of the present disclosure, the controller 100 may include a wireless networking module that communicates with the game system via a wireless connection such as, without limitation, Bluetooth connection, Wireless internet connection, infrared connection, nearfield connection or other wireless communication standard.

The external device input ports 122 may be used as inputs for additional devices, such as controllers, joysticks, foot pedals or other game system accessories. The controller 100 may be powered from a control information output port 121 or, optionally from the power port 124. Power from the control information output port 121 may come from the game system and power port 124 may come from an external power supply. Additionally, in some embodiments, the controller may be powered from and include batteries such as and without limitation, disposable batteries, rechargeable batteries or rechargeable battery packs. In such embodiments, the control information output port or power port may be used to charge the batteries. Additionally an expansion interface port 130 may allow the device to be attached to one or more other devices using an expansion interface connector.

The paddle interface port 125 for the modular input control paddles 103, 123 is also shown in FIG. 2. As shown, there may be different types of modular input control paddles. A first modular input control paddle type 103 may be a straight paddle design that includes a flat or slightly curved paddle portion with an interface tab 128 that extends from the plane of the paddle. In some embodiments, the connection between the interface tab and the paddle may be slightly bent causing a slight downward or upward tilt of the paddle when the interface tab is horizontally aligned. The slight bent may be 45 degrees or less relative to the horizontal plane of the interface tab. A second paddle type 123 may have an interface tab 129 that includes a 90 degree bend. Other paddle types include those having other angles of bend. The interface between the paddle portion and the interface tab 129 may have slight bent away from the vertical plane of the interface tab. The paddle interface ports 125 for the modular input control paddles 103, 123 may include connection elements 126 that allow the user interactions with the paddles to be converted to control inputs. For example and without limitation these connection elements may include a button, micro switch or other physical switching element that is activated when the user the moves the input control paddle. Additionally a securing element 127 may ensure that the interface tab stays in the paddle interface port 125 additionally the securing element 127 may include a fulcrum or other physical protrusion that enables the interface tab to better actuate the connection element. For example and without limitation the securing element 127 may be without limitation, clasp or catch or bumper, or pad made of plastic, rubber, Teflon or metal.

Figure 3:
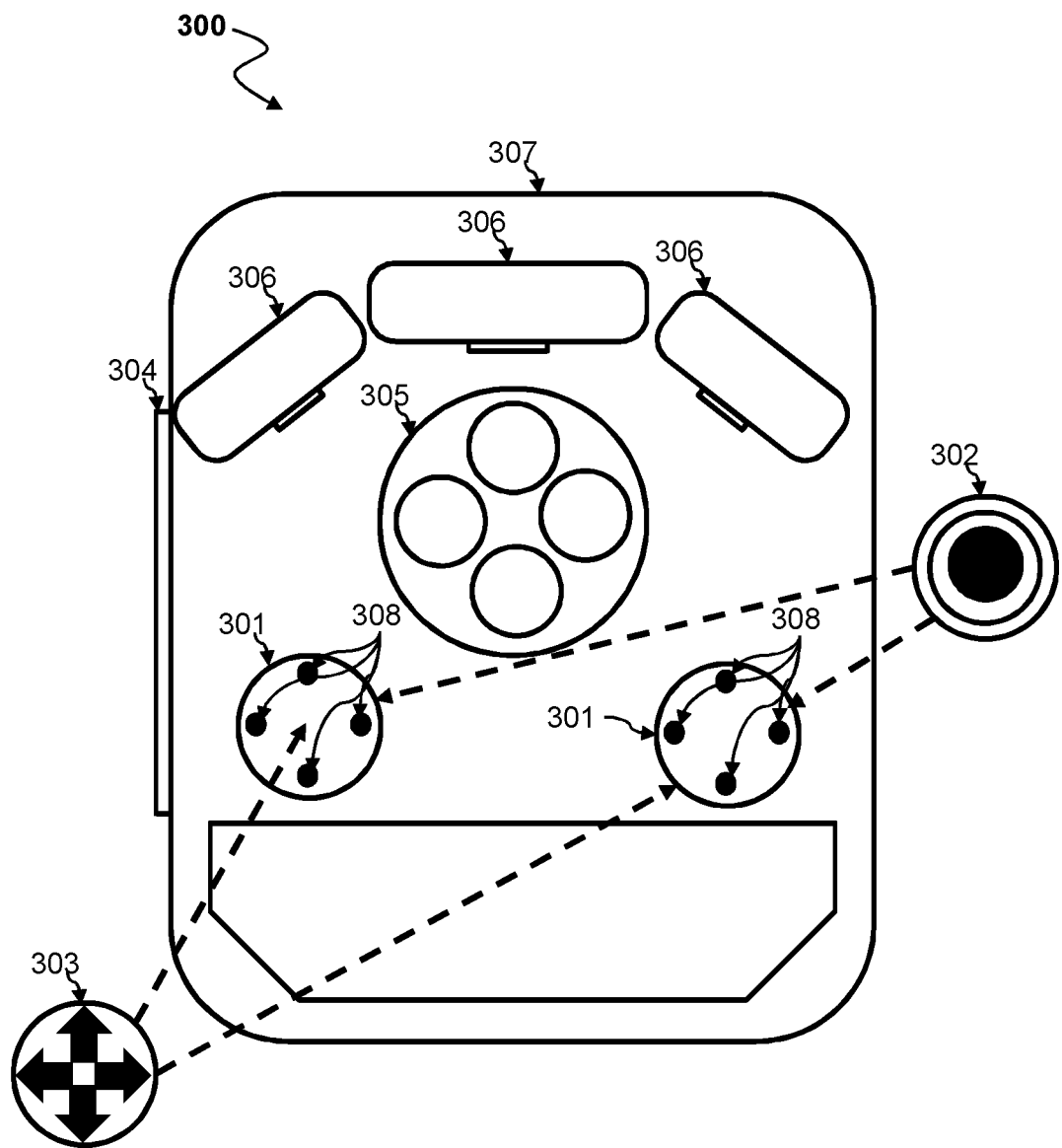
FIG. 3 depicts another embodiment of the controller having two interface ports and modular input controls according to aspects of the present disclosure.
Figure 4:
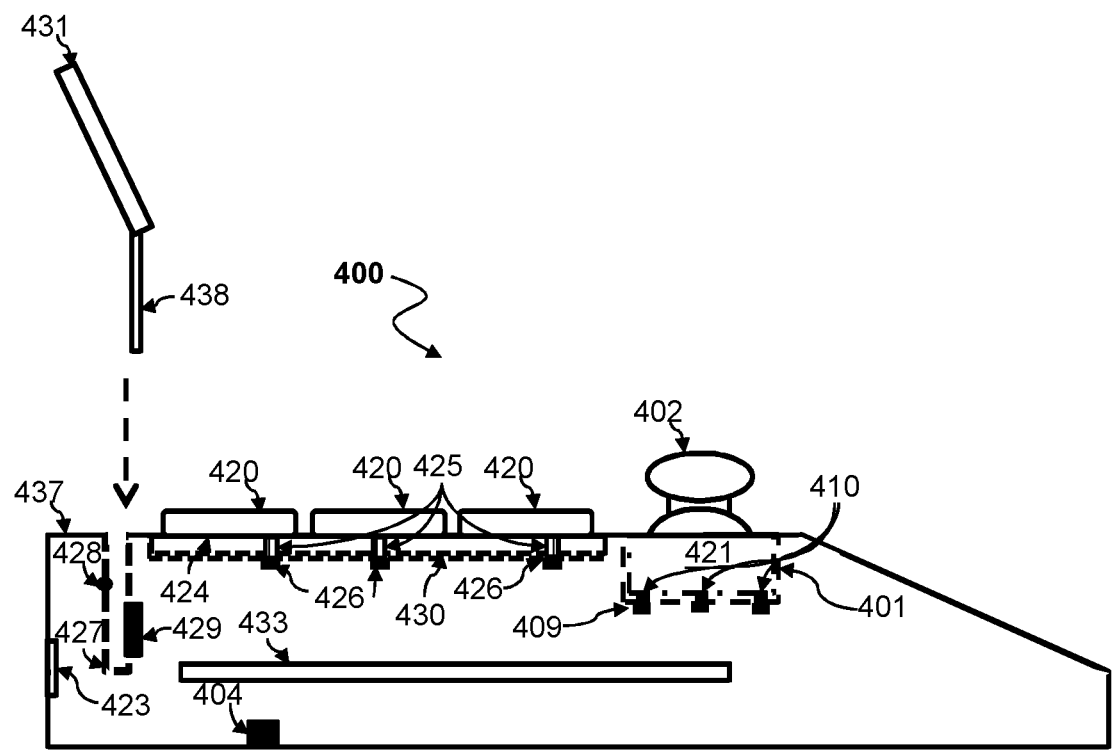
FIG. 4 depicts a side view of the controller having three interface ports including a larger diameter in modular input control and two smaller diameter input controls removably attached according to aspects of the present disclosure.

FIG. 3 depicts another example of a controller 300 having two interface ports 301 and modular input controls 302, 303 according to aspects of the present disclosure. As shown the controller 300 may include additional buttons 305 these buttons may be fixed to the controller body 307, as shown in FIG. 3 or may be removably attached to the controller body 307 as shown in FIG. 4. By contrast, to the example depicted in FIG. 1 and FIG. 2, the modular input controls 302, 303 may be of a smaller diameter than the modular input controls of FIG. 1 and FIG. 2. In the implementation shown in FIG. 3, the interface port includes one or more communication pads 308, the pads shown are communication spots instead of the circular tracks of FIGS. 1 and 2. The communication spots may be arranged such that the modular control inputs 302, 303 may be installed in several different orientations while still being operable. For example and without limitation the communication spots 308 may be arranged in a cross or in a circular pattern about the interface port 301. Alternatively, these interface port 301 may implement communication pads to that of FIGS. 1 and 2. The modular input controls 302 and 303 are interchangeable and each control may be installed in either of the two interface ports 301, as indicated by the dashed arrows. The modular input controls 302, 303 may be different. By way of example, a modular input joystick 302 and directional pad 303 are shown. Additionally the controller body 305 may include control paddle interface ports that allow control paddles 306 to be used with the controller 307. Alternatively, the control paddles may be affixed to the controller body 307 and not removable. The control paddles 306 may be arranged in a semi-circle about the main button set 305. The controller body may also include an expansion interface 304. The expansion interface 304 may be configured to communicatively couple to an expansion interface of another controller or two an expansion board.

FIG. 4 depicts a side view of a controller 400 having three interface ports including a larger diameter modular input control and two smaller diameter input controls removably attached according to aspects of the present disclosure. The controller shown includes a removable large diameter modular input control 424 with a plurality of buttons 420 and removable input control paddles 431. To facilitate communication with the removable large diameter input control, the controller body 437 may include a large diameter interface port 430. The interface port 430 may include communication pads 426 that may extend around a circumference of the interface port 430 either in the bottom or alternatively in sidewall. In some embodiments, the communication pads may be recessed below a bottom plane of the interface port and connection pins may extend below the bottom plane of the interface port to make contact with the communication pads. As discussed with respect to FIG. 1 and FIG. 2, the large diameter modular input controls may include one or more connection pins 425 that conductively and/or communicatively couple the large diameter input control to the controller body 437 and a control board housed within the controller body and ultimately a game system. The large diameter modular input control 424 may be removably attached to the controller body 437 by way of a magnet within the interface port 330 or a latch in the side of the interface port 430.

The smaller diameter modular input control 402 is a joystick as shown. The smaller diameter input control 402 includes an interface connector region 421 with connection pins 410, which are configured to make conductive and/or communicative contact with the communication pads on the bottom 409 or alternatively sides of the smaller diameter interface port 401. In some embodiments, the communication pads may be recessed below a bottom plane of the interface port and connection pins may extend below the bottom plane of the interface port to make contact with the communication pads. The smaller diameter modular interface control 402 may be removably attached to the controller body 437 by way of a magnet within the interface port 401 or a latch in the side of the interface port 401.

A removable input control paddle 431 may also be removably attached to the controller body 437. The removable input control paddle may be slightly bent causing a slight tilt of the paddle when the interface tab 438 is vertically aligned. The slight bent may be 45 degrees or less relative to the vertical plane of an interface tab 438. The controller body may include a control paddle interface port 427, which may include a securing element 428 and a connection element 429 similar to those discussed with respect to FIG. 2.

The controller body 427 may also include one or more control information output ports 423, (optionally) one or more external device input ports 404, and (optionally) a power port. It should be note that communication to the game system is not limited to the output port 423. In alternative embodiments of the present disclosure, the controller 400 may include a wireless networking module that communicates with the games system via a wireless connection such as, without limitation, Bluetooth connection, Wireless internet connection, infrared connection, nearfield connection or other wireless communication standard.

The external device input ports 423 may be used as inputs for additional devices, controllers, joysticks, foot pedals or other game system accessories. The controller 300 may be powered from a control information output port or, optionally from the power port. Power from the control information output port may come from the game system and power port may come from an external power supply. Additionally, in some embodiments, the controller may be powered from and include batteries such as and without limitation, disposable batteries, rechargeable batteries or rechargeable battery packs. In such embodiments, the control information output port or power port may be used to charge the batteries. The controller may include an expansion interface port 433 and expansion interface connector 404. The expansion interface connector may be configured to fit into a side expansion interface port 433, thus allowing two or more controllers to be used together. A bottom located expansion interface port may allow controllers to be used together with an additional bottom mounted expansion interface connector.

Figure 5:
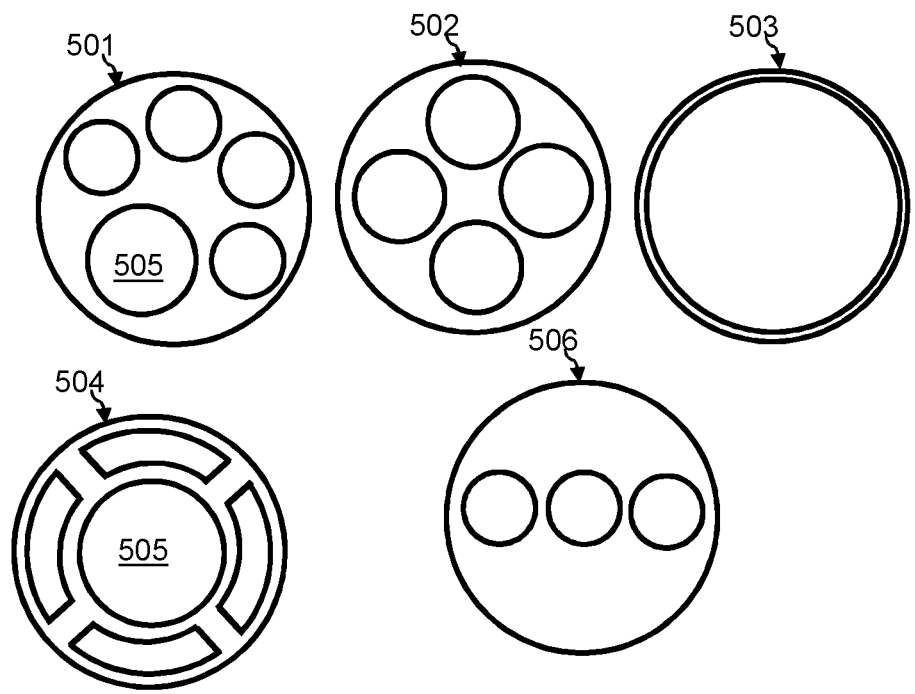
FIG. 5 depicts a top-down view of various embodiments of the large diameter modular input control according to aspects of the present disclosure.

FIG. 5 depicts a top-down view of various implementations of the large diameter modular input control according to aspects of the present disclosure. As shown the various different arrangements for buttons of the large diameter modular input control are possible. The different implementations shown are a five-button configuration with large side button 501 a four button configuration 502 a single button configuration 503 a three button configuration 506 and a five button configuration with large middle button 504. In some embodiment the large button 505 or another button may function as a configuration switch allowing the modality of operation of the large diameter input control to change from one configuration to another. Modality of operation as defined herein is the function performed by the button when an input is applied. For example and without limitation, one modality of operation may be as a directional pad while another modality of operation may be as selection or action buttons. The cross configuration of 502 and 504 lends those modular input controls as particularly useful as either directional pads or action buttons. As described above the modular input controls may be used in any orientation and therefore a configuration with no specifically designated function for each key may be desirable as each button's function may be configured separately in software or firmware of the controller, to suit the various needs of the user and programs.

Figure 6:
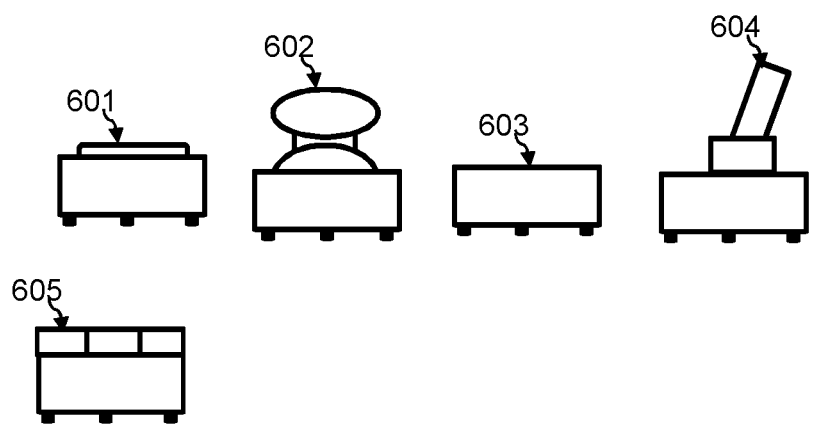
FIG. 6 shows side profile views of various embodiments of the smaller diameter modular control input.

FIG. 6 shows side profile views of various embodiments of the smaller diameter modular control input. The smaller diameter modular controls inputs shown are a button 601, joystick 602, blank 603, switch 604, directional pad 605. The blank 603 is an interface portion without a button; it simply fills the interface port so that the communication pads are covered. In alternative embodiments, the blank may simply be disk that fits over the interface port.

The Joystick 602 may be configured to operate in multiple orientations. That is the axes of the joystick 602 may be configurable relative to the controller body so that either the X or Y axis may be changed to be true north. By way of example, and not by way of limitation, such reconfiguration may be implemented in hardware, software, or firmware. This allows the joystick 602 to operate in any orientation as the X and Y axis can be switched. In some implementations, a user may program cardinal directions through a console, computer, or other device coupled to the control input. Additionally in some alternative implementations the Joystick may not have a hard defined X and Y axis and the user may be able to configure in software or firmware what movements of the joystick correspond to movements in the game system. This thus allows the user to install the joystick in any orientation and then configure they joystick to fit the needs of the user and the installed orientation.

As discussed above the modular input controls communicate to a control board inside the controller body by way of connection points in contact with communication pads. The control board may be configured to identify inputs made to the modular input controls by way of an analog change in voltage or current through the modular input controls. The change in current or voltage may be pre-defined as being representative of a certain input and each possible input may have a unique current or voltage change assigned to input. Alternatively, modular inputs may provide digital commands with each modular input providing a digital signature identifying the type of input to the control board. The inputs made to the modular input control by the user may be then be converted to digital signals which are interpreted by the controller or alternatively by the game system. In this way, the control board may be configured to identify the modality of operation of modular input controls or the type of input made by the user to the controls. The control board may be by way of example and not by way of limitation a circuit board wires with other electrical circuitry such as processors, FPGAs, or ASICS for transducing inputs provided from modular input controls to input information for the game system.

Figure 7:
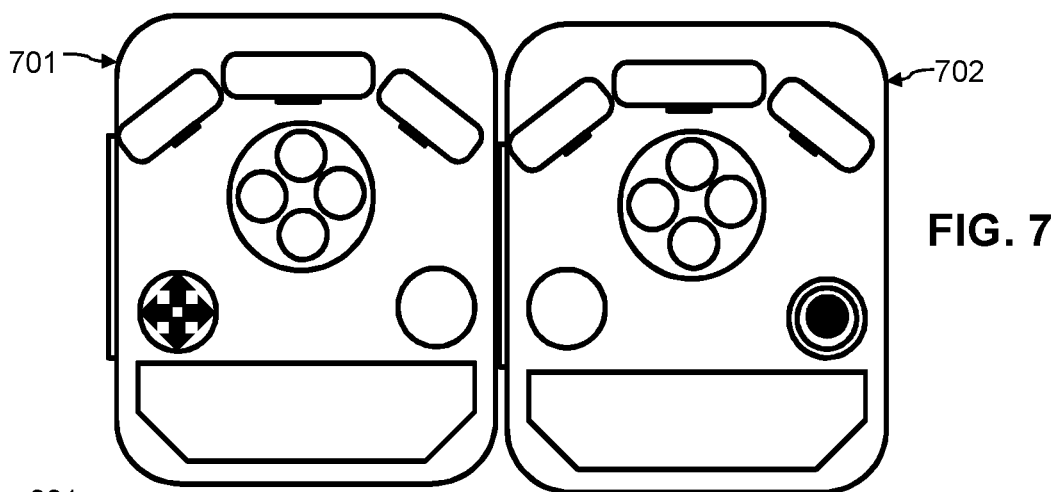
FIG. 7 shows a top-down view of a first and second controller connected via the side expansion interface connector according to aspects of the present disclosure.
Figure 8:
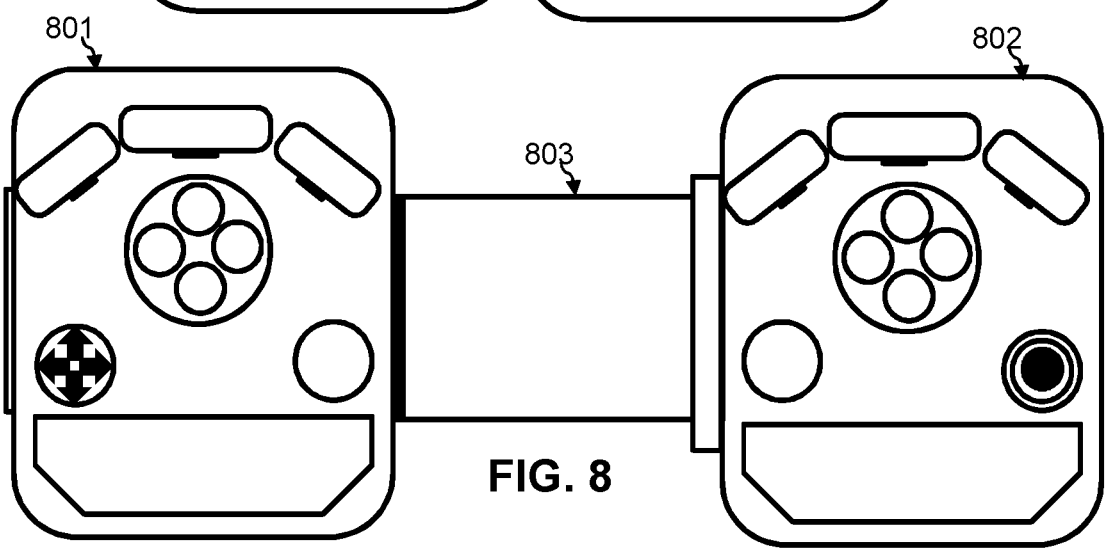
FIG. 8 depicts a top-down view of a first and second controller connected via expansion interface connector with extension according to aspects of the present disclosure.
Figure 9:
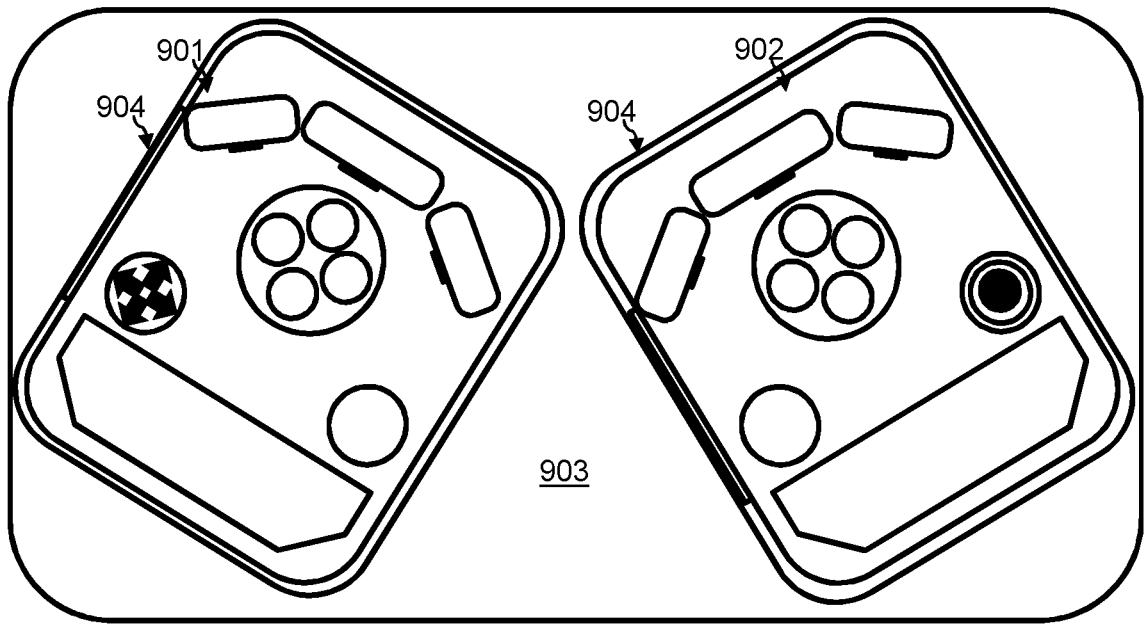
FIG. 9 shows a top-down view of two controllers coupled using a bottom mounted expansion interface connector according to aspects of the present disclosure.

FIGS. 7, 8, and 9 depict various embodiments of the external device input ports with two controllers. FIG. 7 shows a first controller 701 and second controller 702 connected via the side expansion interface connector 304. In this embodiment, the side mounted expansion interface connector 304 of the second controller 702 is slotted into the side mounted expansion interface port of the first controller 701. FIG. 8 depicts a first and second controller connected via an expansion interface connector with an extension 803. The extension 803 may provide both mechanical and communicative connection to the expansion interface connector of the second controller 802 and the expansion interface port of the first controller 801. The extension 803 may allow the controllers to be used in a configuration that is more comfortable for the user with both controllers slightly apart. FIG. 9 shows two controllers coupled using a bottom mounted expansion interface connector 903 according to aspects of the present disclosure. A first controller 901 and a second controller 902 may be coupled to an expansion interface connector 903 through interface slots 904 in the top of the expansion interface connector. These interface slots 904 may allow the controllers to fit at a comfortable angle and/or level for the user. The expansion interface allows two controllers to be treated by the game system as one large controller.

Figure 10:
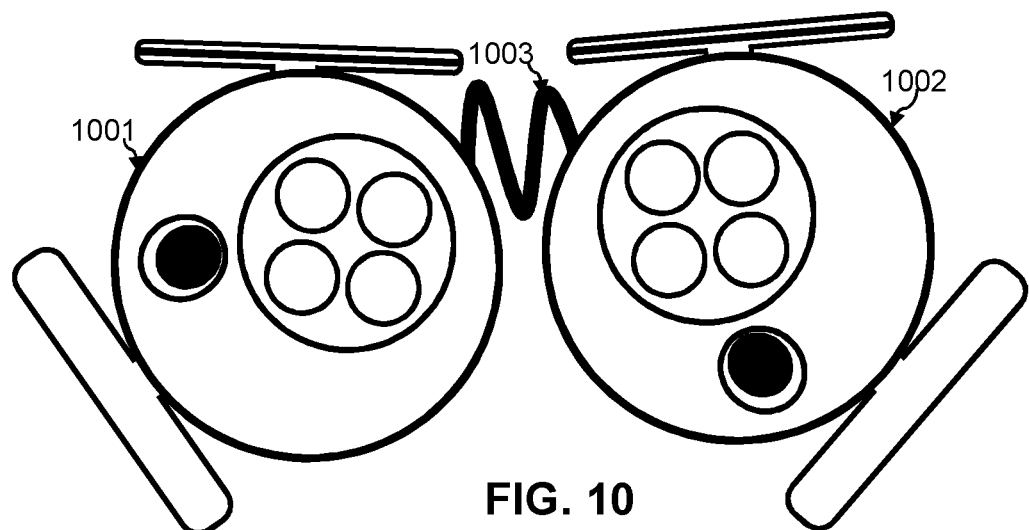
FIG. 10 shows a first controller and second controller connected via an expansion interface connector according to aspects of the present disclosure.
Figure 11:
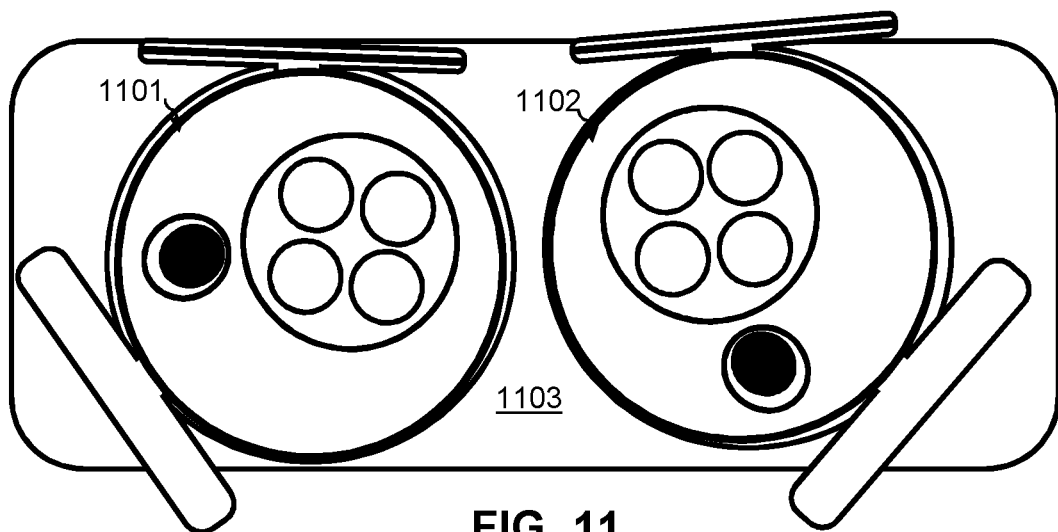
FIG. 11 shows a first and second controller connected using a bottom mounted expansion interface connector according to aspects of the present disclosure.

FIG. 10 and FIG. 11 depict controllers with the single modular input control coupled with expansion interface connectors according to aspects of the present disclosure. FIG. 10 shows a first 1001 controller and second controller 1002 connected via an expansion interface connector 1003 in this embodiment the expansion interface connector is coupled via an external device input port of the both controllers. Here the expansion interface connector may be a data cord that connects both devices. FIG. 11 shows a first and second controller 1101, 1102 connected using a bottom mounted expansion interface connector 1103. The expansion interface connector 1103 may communication with the controller via an expansion interface port on the bottom of the controller body.

Figure 12:
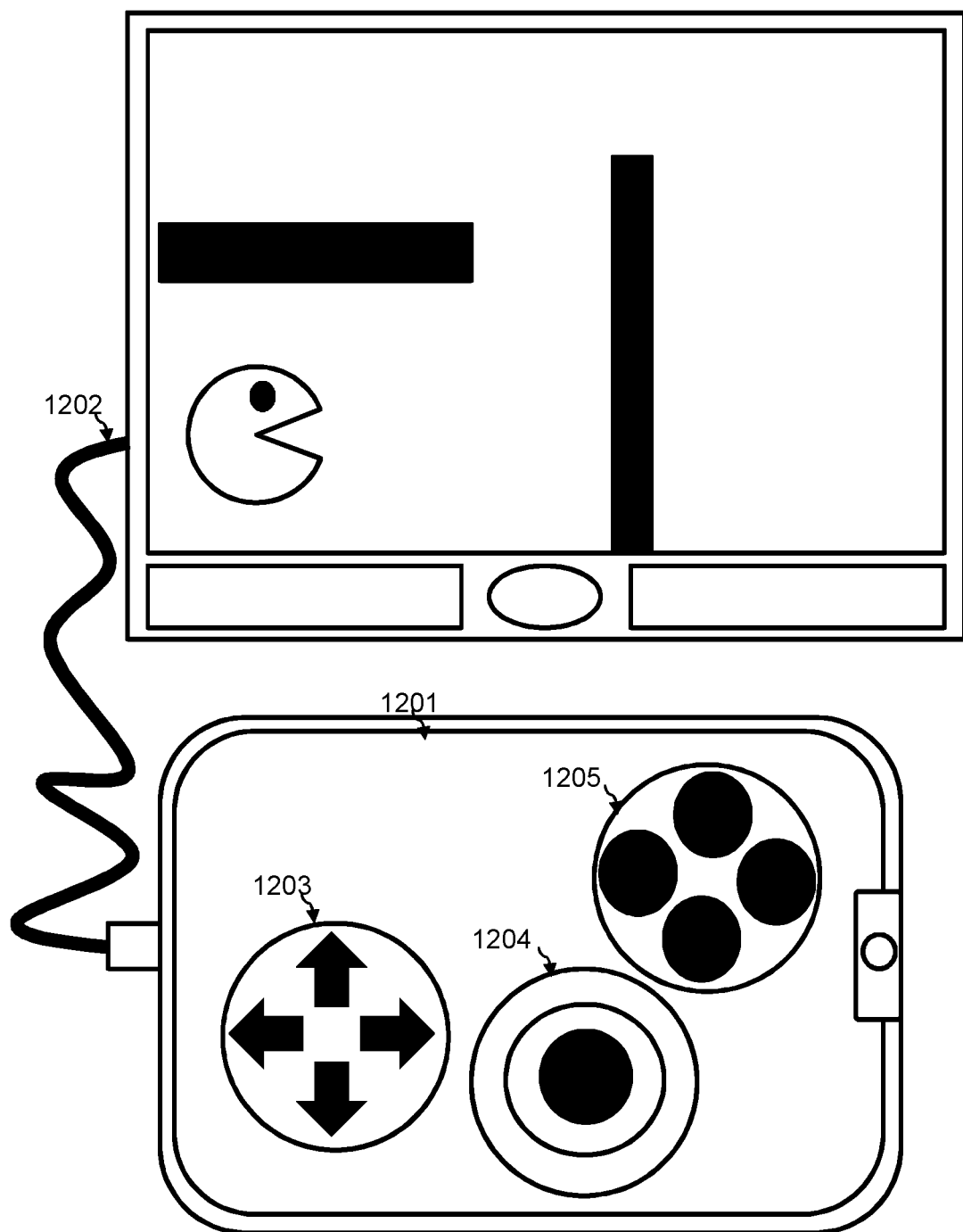
FIG. 12 shows a controller implemented on a touchscreen according to aspects of the present disclosure.

FIG. 12 shows a controller implemented on a touchscreen according to aspects of the present disclosure. While the above embodiments describe a controller with physically interchangeable modular input controls aspects of the present disclosure are not so limited.

As seen in FIG. 12 the controller may comprise a touch screen 1201 coupled to the game system 1202. The touch screen 1201 may be for example and without limitation, stand-alone, part of a videogame controller, part of mobile phone or part of a tablet computer. While as shown the touch-screen is connected to the game system via a physical cord aspects of the present disclosure are not so limited. The touch screen may be communicatively coupled to the game system via wired connection or via a wireless connection.

The touch screen may display one or more different modular input controls 1203, 1204, 1205. Here, three modular input controls are displayed on the screen each having a different control modality. The three modular input controls on the touchscreen shown are a directional pad 1203, a virtual joystick 1204 and action buttons 1205. The touch-screen controller may be programmed to allow the image of each of the modular input controls to be moved anywhere within the touch screen independently. The touchscreen controller may also convert user touches at areas of the screen where the image of the modular input control is displayed to the appropriate inputs. Additionally, the modular input controls 1203, 1204, and 1205 may be removed from the touch screen or added to the touchscreen allowing any number of modular input controls to be displayed on the screen and usable by the user.

Aspects of the present disclosure provide enhanced modular design and interchangeable components allow many different options so that a given implementation can meet different requirements.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A controller device comprising;
    a controller body wherein the controller body includes at least two interface ports, a control information output port and one or more paddle interface ports to communicatively couple an input control paddle to the controller body wherein at least one paddle interface port is located on a side of the controller body;
    a modular input control removably attachable to the controller body, wherein the modular input control includes an interface connector region that communicatively couples the modular input control to one of the at least two interface ports, wherein the interface connector region is configured to couple the modular input control to any of the at least two interface ports; and a first input control paddle removably attachable to the controller body.

2. The device of claim 1 wherein the modular input control includes a directional pad.

3. The device of claim 1 wherein the modular input control includes a single button.

4. The device of claim 1 wherein the modular input control includes a plurality of buttons.

5. The device of claim 1 wherein the at least two interface ports include a first and second interface ports located on opposite sides of the controller body and wherein the modular input control is a first modular input control.

6. The device of claim 5 further comprising a second modular input control removably attached to the controller body wherein the second modular input control includes an in interface connector region coupled communicatively coupled to the second interface port.

7. The device of claim 6 wherein the first and second modular input controls have different control modalities.

8. The device of claim 6 wherein the first and second modular input controls have the same control modality.

9. The device of claim 6 wherein the first and second modular input controls are interchangeable between the first and second interface ports.

10. The device of claim 1 wherein the modular input controller includes a modifier button and a plurality of other buttons, wherein the modifier button changes a button mapping for the plurality of buttons.

11. The device of claim 1 wherein the modular input control, interface connector region includes a magnetic attachment mechanism.

12. The device of claim 1 further comprising an expansion interface wherein the expansion interface is a configured to operatively couple with a second controller body.

13. The device of claim 12 further comprising an expansion interface connector wherein the expansion interface connector is configured to couple the controller body to a second controller body.

14. The device of claim 1 wherein the modular input control is a joystick.

15. The device of claim 1 wherein the modular input control is a switch.

16. The device of claim 1 further comprising a modular input control blank wherein the modular input control blank covers a second interface port of the at least two interface ports.

17. The device of claim 1 wherein one of the one or more paddle interface ports is located on a top of the controller body.

18. The device of claim 1 further comprising a second input control paddle wherein the second input control paddle includes a bent interface tab.

* * * * *